(12) United States Patent
Deaton et al.

(10) Patent No.: US 8,636,263 B2
(45) Date of Patent: Jan. 28, 2014

(54) SYSTEM AND METHOD FOR LOCKING RETENTION OF VALVE COMPONENTS

(75) Inventors: Steven Scott Deaton, Ankeny, IA (US); John David Canny, Indianola, IA (US)

(73) Assignee: Delavan Inc, West Des Moines, IA (US)

( * ) Notice: Subject to any disclaimer, the term of this patent is extended or adjusted under 35 U.S.C. 154(b) by 1412 days.

(21) Appl. No.: 12/544,265

(22) Filed: Aug. 20, 2009

(65) Prior Publication Data
US 2011/0041805 A1 Feb. 24, 2011

(51) Int. Cl.
*F01L 3/10* (2006.01)
*F02C 1/00* (2006.01)

(52) U.S. Cl.
USPC .............................................. 251/337; 60/741

(58) Field of Classification Search
USPC .......... 60/734, 740, 741, 39.094, 39.91, 39.1; 137/529, 541, 542; 251/337, 336; 239/533.2
See application file for complete search history.

(56) References Cited

U.S. PATENT DOCUMENTS

| | | | | |
|---|---|---|---|---|
| 2,586,147 A | * | 2/1952 | Caserta | 137/536 |
| 2,969,925 A | * | 1/1961 | Burgess et al. | 239/453 |
| 3,157,191 A | * | 11/1964 | Garrett et al. | 137/332 |
| 3,662,959 A | * | 5/1972 | Sample, Jr. | 239/533.2 |
| 4,726,396 A | * | 2/1988 | Bradley et al. | 137/549 |
| 5,417,054 A | * | 5/1995 | Lee et al. | 60/39.094 |
| 5,732,730 A | * | 3/1998 | Shoemaker et al. | 137/118.06 |
| 5,809,771 A | * | 9/1998 | Wernberg | 60/39.094 |
| 6,371,441 B1 | * | 4/2002 | Mattes | 251/129.08 |
| 6,901,953 B2 | * | 6/2005 | D'Agostino et al. | 137/512.1 |
| 7,506,663 B2 | * | 3/2009 | Thomas et al. | 137/529 |
| 2003/0094203 A1 | | 5/2003 | D'Agostino et al. | |

FOREIGN PATENT DOCUMENTS

EP 0150619 A2 8/1985

OTHER PUBLICATIONS

European Search Report dated Jan. 9, 2012 related to co-pending EP Patent Application No. 10251345.

* cited by examiner

*Primary Examiner* — Gerald L Sung
(74) *Attorney, Agent, or Firm* — Edwards Wildman Palmer LLP; Joshua L. Jones; Scott D. Wofsy (57) ABSTRACT

A pressure actuated valve assembly includes a valve body. The downstream end portion of a main spring is engaged with a downstream end portion of the valve body and the main spring is axially aligned with the valve body. A main spring guide is engaged with an upstream end portion of the main spring proximate an upstream end portion of the valve body. The main spring guide is mounted for movement toward the downstream end portion of the valve body by compression of the main spring. A hold-down sleeve is engaged with the downstream end portion of the valve body and includes a stop structure proximate the main spring guide. The stop structure is configured to engage the main spring guide to maintain a predetermined minimum clearance between the main spring guide and the upstream end portion of the valve body with the valve body in the closed condition.

12 Claims, 6 Drawing Sheets

SYSTEM AND METHOD FOR LOCKING RETENTION OF VALVE COMPONENTS

BACKGROUND OF THE INVENTION

1. Field of the Invention

The present invention relates to fluid control valves, and more particularly to pressure actuated valves for fuel injectors employed with gas turbine engines.

2. Description of Related Art

Pressure actuated valves are well known in the art, and one example is a valve assembly used in a fuel system to provide specific flow rates as a function of pressure. One particular application of such valves is in fuel injector systems of gas turbine engines.

It is well known that in fuel supply systems of gas turbine engines, for example, it is desirable when the engine is shut down to preclude flow of even small amounts of fuel to the nozzles that deliver fuel to the combustion chamber. It is also desirable to open valves to provide an initial flow of fuel from the reservoir to the engine when a relatively low pressure differential exists between the reservoir and the engine, as during engine start up. In many applications, it is also desirable to meter the amount of fuel supplied to the engine when the engine is operated under load, by opening a second, variable-rate flow path when the pressure differential exceeds a predetermined value.

In the past, it has been customary for these two functions, namely the check valve and metering valve functions, to be performed by two substantially independent valve assemblies. However, the use of two separate valve assemblies results in increased cost and weight, increased use of space and increased opportunities for malfunctions to occur among the multiple components that are required.

Valves have been constructed in which the functions of check valve and metering valve are combined into a single multi-port valve assembly. Typical valves of this type have relied on combinations of separate metering valves and check valves, resulting in relatively large part counts and weights. Other valves have incorporated pressure actuated designs having a combined, multi-port valve assembly that is more compact, requires fewer parts and is lighter in weight than the conventional combined valves.

Depending on the design and the joining methods used, it can be difficult to achieve a high degree of precision during assembly of previously known multi-port valves. Imprecise assembly can result in significant deviations between actual valve performance and desired valve performance. For example, if valve parts are welded or brazed during assembly, thermal expansion or other distortions arising during the welding process can render precision features designed into the valve assembly inoperative.

While the conventional systems and methods have generally been considered satisfactory for their intended purposes, there still remains a continued need in the art for valve assemblies having improved precision and performance. There also remains a need in the art for methods of assembling such valves. The present invention provides a solution for these problems.

SUMMARY OF THE INVENTION

The subject invention is directed to a new and useful pressure actuated valve assembly. The valve assembly includes a valve body defining a longitudinal axis and having opposed upstream and downstream end portions. The valve body includes a valve member mounted therein for axial movement along the longitudinal axis between a closed condition and an open condition. The valve assembly also includes a main spring having opposed upstream and downstream end portions. The downstream end portion of the main spring is engaged with the downstream end portion of the valve body with the main spring axially aligned with the valve body. A main spring guide is engaged with the upstream end portion of the main spring proximate the upstream end portion of the valve body. The main spring guide is mounted for movement toward the downstream end portion of the valve body by compression of the main spring. A hold-down sleeve is engaged with the downstream end portion of the valve body and includes a stop structure proximate the main spring guide. The stop structure is configured to engage the main spring guide to maintain a predetermined minimum clearance between the main spring guide and the valve member with the valve body in the closed condition.

In certain embodiments, the hold-down sleeve includes a longitudinal wall that has a plurality of fluid openings configured to provide fluid communication between an area exterior to the hold-down sleeve and an area interior thereto. It is also contemplated that the hold-down sleeve can include a plurality of axial slots defined through a downstream portion of the longitudinal wall of the hold-down sleeve with a flexible finger defined in the longitudinal wall circumferentially between each pair of adjacent axial slots. Each finger can include a portion of an inward protruding cleat defined on a downstream portion thereof. It is contemplated that one axial slot can originate at each of the fluid openings and can terminate at a downstream end of the hold-down sleeve.

It is also contemplated that in certain embodiments the hold-down sleeve includes an inward protruding cleat defined on a downstream portion thereof. The downstream end portion of the valve body can include a circumferential groove with the cleat of the hold-down sleeve engaged with the circumferential groove of the valve body. A housing can be engaged outboard of the hold-down sleeve, the housing being configured to maintain engagement of the cleat of the hold-down sleeve in the circumferential groove of the valve body by preventing movement of the cleat radially outward from the circumferential groove. The stop structure of the hold-down sleeve can engage the main spring guide and can compress the main spring to maintain the predetermined minimum clearance between the main spring guide and the valve member of the valve body with the valve body in the closed condition.

The invention also provides a fuel injector for a gas turbine engine. The fuel injector includes a fuel inlet section, a feed arm extending from the fuel inlet section, and a nozzle body extending from the fuel feed arm and in fluid communication with the fuel inlet section. An inlet housing is provided within the fuel inlet section and defines a longitudinal axis. A hold-down sleeve inboard of the inlet housing has opposed upstream and downstream end portions with a stop structure defined in the upstream end portion. A valve body is provided having opposed upstream and downstream end portions. The downstream end portion of the valve body is engaged with the downstream end portion of the hold-down sleeve. The valve body includes a valve member mounted therein to regulate flow through the inlet housing by movement along the longitudinal axis between a closed condition and an open condition. A main spring has opposed upstream and downstream end portions with the downstream end portion of the main spring being engaged with the downstream end portion of valve body. The main spring is axially aligned with the inlet housing. A main spring guide is engaged with the upstream end portion of the main spring proximate the upstream end portion of the valve body. The main spring guide is mounted for movement toward the downstream end portion of the valve body by compression of the main spring. The main spring guide is configured and adapted to engage the stop structure of the hold-down sleeve to maintain a predetermined minimum clearance between the main spring guide and the valve member of the valve body with the valve body in the closed condition.

The invention also provides a method of assembling a pressure actuated valve assembly. The method includes steps of providing a valve assembly and providing a hold-down sleeve. The valve assembly includes a valve body defining a longitudinal axis and having opposed upstream and downstream end portions with a circumferential groove defined in the downstream end portion thereof. A main spring has a downstream end portion engaged with the downstream end portion of valve body and has an upstream end portion opposite its downstream end portion. A main spring guide is engaged with the upstream end portion of the main spring proximate the upstream end portion of the valve body. The main spring guide is mounted for movement toward the downstream end portion of the valve body by compression of the main spring. The hold-down sleeve includes a downstream end portion defining an opening with an inward protruding cleat defined therein and an upstream end portion defining a stop structure therein. The stop structure is configured and adapted to engage the main spring guide to maintain a predetermined minimum clearance between the main spring guide and the upstream end portion of the valve body in a closed condition.

The method includes steps of radially expanding the opening of the hold-down sleeve over the main spring guide, moving the upstream end portion of the valve assembly into the hold-down sleeve to bring the cleat of the hold-down sleeve into proximity with the circumferential groove of the valve body, and engaging the cleat of the hold-down sleeve into the circumferential groove of the valve body.

In certain embodiments, the method includes the steps of providing a valve housing. The cleat of the hold-down sleeve can be locked in position within the circumferential groove of the valve body radially by engaging the hold-down sleeve and valve assembly into the valve housing. These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
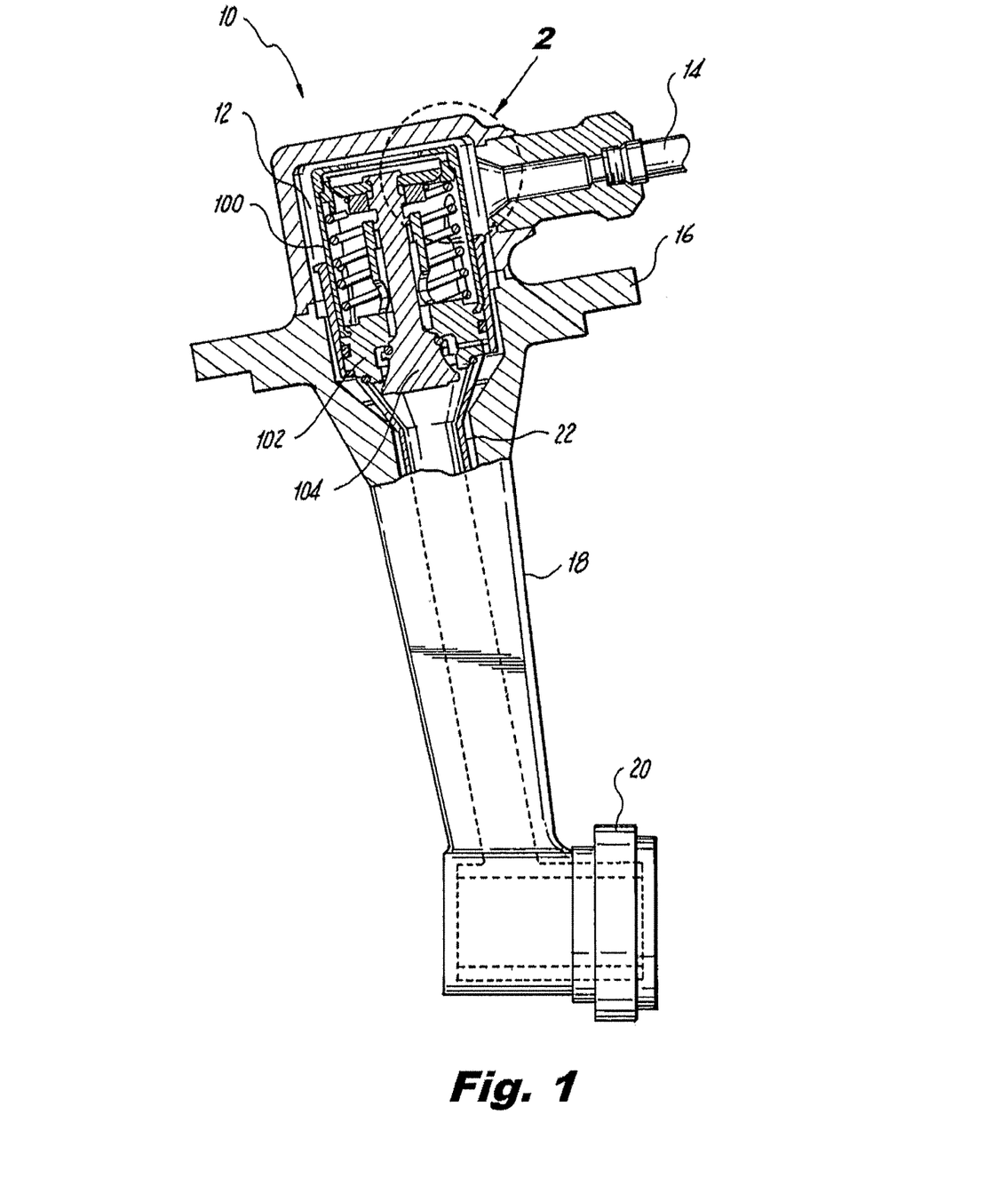
FIG. 1 is a partial cross-sectional side elevation view of a fuel injector including an exemplary embodiment of a valve assembly constructed in accordance with the present invention, showing the valve assembly in a closed condition.

Reference will now be made to the drawings wherein like reference numerals identify similar structural features or aspects of the subject invention. For purposes of explanation and illustration, and not limitation, a partial view of an exemplary embodiment of a valve assembly constructed in accordance with the invention is shown in FIG. 1 and is designated generally by reference character 100. Other embodiments of valve assemblies in accordance with the invention, or aspects thereof, are provided in FIGS. 2-12, as will be described. The systems and methods of the invention can be used to improve precision and performance of valve assemblies, including for example, valve assemblies used in fuel injectors for gas turbine engines.

Referring now to FIG. 1, a fuel injector 10 constructed in accordance with the present invention is shown. Injector 10 includes an inlet section 12 that includes fuel inlet 14 and valve assembly 100. A mounting flange 16 is provided for attaching injector 10 within a gas turbine engine. Injector 10 includes a feed arm 18 extending from inlet section 12 and a nozzle body 20 extending from feed arm 18. Nozzle body 20 is in fluid communication with inlet section 12 via a fuel conduit 22 extending through feed arm 18. Fuel can be supplied from a fuel tank or other reservoir to the combustor of a gas turbine engine by passing into inlet 14, through valve assembly 100 into conduit 22 and out through nozzle body 20.

Valve assembly 100 includes a pressure actuated valve. In its closed condition, valve body 102 blocks flow from inlet 14 to conduit 22 when pressure at inlet 14 is relatively low, such as when the engine is not running. As pressure initially increases at inlet 14, such as during engine start up, valve member 104 of valve body 102 moves axially toward nozzle body 20, opening a fuel path between the stationary portion of valve body 102 and valve member 104 through which fuel can flow to nozzle body 20. The extent to which valve member 104 moves within valve body 102 depends on the pressure supplied at inlet 14. Pressure actuated valves are described in detail in commonly assigned U.S. Pat. No. 5,732,730 to Shoemaker et al, which is incorporated by reference herein in its entirety.

Figure 2:
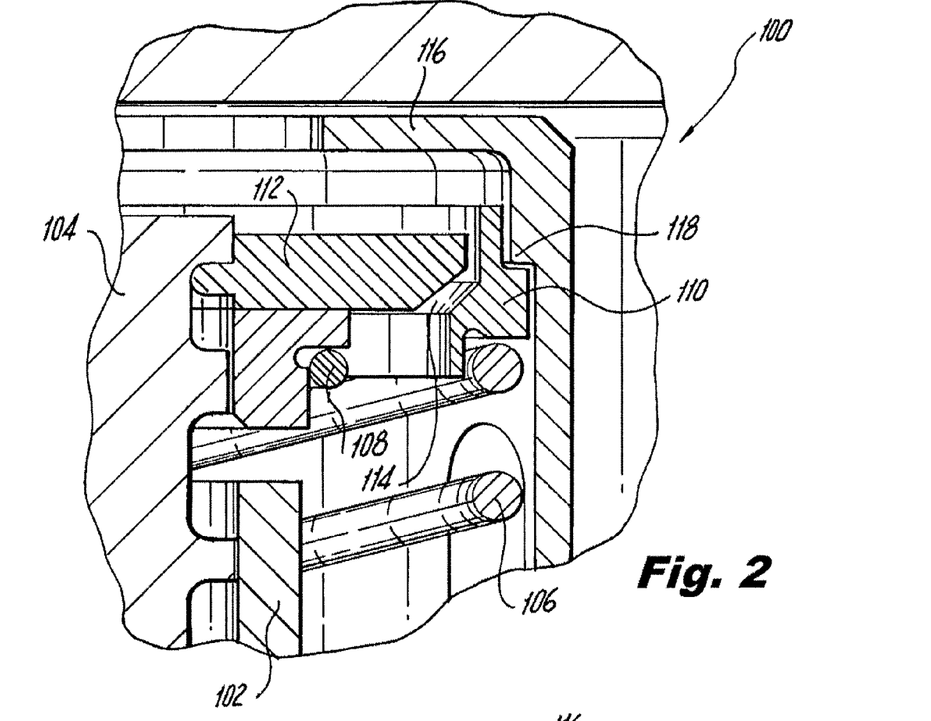
FIG. 2 is a cross-sectional side elevation view of a portion of the valve assembly of FIG. 1, showing the clearance or gap between the upstream end portion of the valve body and the main spring guide with the valve assembly in the closed condition.

Referring now to FIG. 2, valve assembly 100 includes two coiled/helical biasing springs, namely main spring 106 and inner spring 108. Downstream end portions of each of springs 106 and 108 are attached by mechanical joining techniques to a downstream end portion of valve body 102, as shown in FIG. 1. The upstream end portion of main spring 106 is attached to main spring guide 110, as shown in FIG. 2. The upstream end portion of inner spring 108 is attached to upstream end portion 112 of valve body 102, which is mounted for movement along with valve member 104 as described above.

Initially when pressure increases on valve body 102, such as during engine startup, valve member 104 moves downward (with reference to the orientation of the view in FIG. 2) and compresses inner spring 108. Main spring 106 is not compressed initially by the movement of valve member 104, because there is a spatial clearance that is indicated in the drawings as annular gap 114, between main spring guide 110 and upstream end portion 112 of valve body 102. Only after pressure has increased enough to move valve member 104 a sufficient distance to close gap 114 does main spring 106 engage. A transition in the flow rate as a function of input pressure occurs when spring 106 engages to allow for proper metering or scheduling of fuel flow at higher power levels. This transition can occur, for example, when making the transition from idle engine operation to a higher power level such as at take off. As pressure continues to increase after main spring 106 has engaged, valve member 104 compresses both springs 106 and 108 as it continues to further advance toward a fully open condition and thus increase flow to nozzle body 20. Those skilled in the art will readily appreciate that the spring constants or characteristics of springs 106 and 108 as well as the dimensions of gap 114 can be varied to provide appropriate pressure versus flow rate characteristics for specific applications.

With continued reference to FIG. 2, to ensure the predetermined design pressure level for a particular valve assembly is met before main spring 106 is engaged, maintenance of a predetermined minimum gap 114 is required for the closed condition of valve body 102. To achieve this predetermined minimum gap 114, hold-down sleeve 116 is provided. In particular, hold-down sleeve 116 includes a stop structure 118 that engages a corresponding structure on main spring guide 110, as indicated in FIG. 2. Stop structure 118 prevents main spring 106 from pushing main spring guide 110 beyond a predetermined location with respect to gap 114, regardless of whether main spring 106 is relaxed or partially compressed when valve body 102 is in the closed condition. Thus, a precise predetermined minimum width of gap 114 can be maintained with valve assembly 100 in the closed or no-flow condition.

Figure 3:
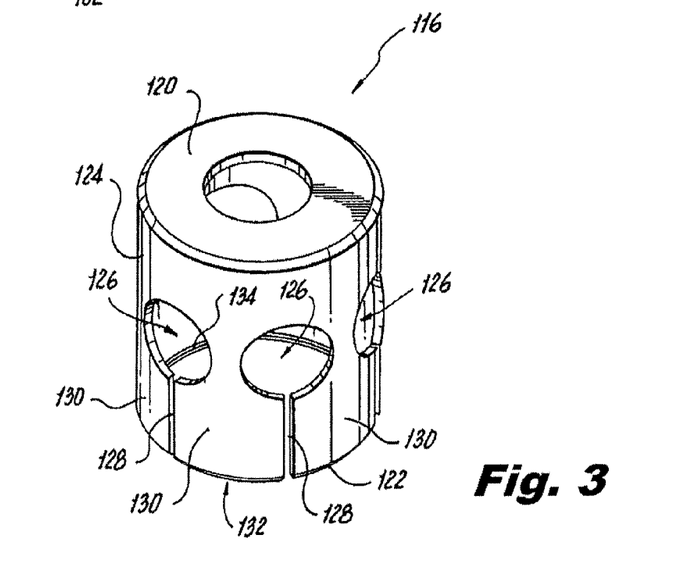
FIG. 3 is a perspective view of the hold-down sleeve of the valve assembly of FIG. 1, showing the fluid ports and corresponding longitudinal slots.

Referring to FIG. 3, hold-down sleeve 116 includes an upstream end portion 120, a downstream end portion 122, and a longitudinally running lateral wall 124 extending therebetween. Lateral wall 124 includes six circumferentially spaced apart fuel ports 126 each with an associated elongate slot 128 extending to downstream end portion 122. Fuel ports 126 facilitate fluid flow within the bore of inlet section 12 from a space exterior to hold-down sleeve 116 to a space interior thereto. In combination, fuel ports 126 and slots 128 provide flexibility to six deflectable fingers 130 defined circumferentially between each adjacent pair of slots 128. The flexibility of fingers 130 provides for radial expansion of main opening 132 during construction of valve assembly 100, as will be described in greater detail below.

Downstream end portion 122 includes a radially inwardly extending cleat 134, a portion of which is defined at the end of each finger 130. Cleat 134 engages valve body 102, as is described below with respect to FIGS. 7 and 10-12. Those skilled in the art will readily appreciate that any suitable number or configuration of ports and longitudinal slots can be used for a given application without departing from the spirit and scope of the invention. Hold-down sleeve 116 can be constructed of high strength, corrosive resistant metallic materials, such as stainless steel, the like, or any other material suitable for a given application.

Figures 4, 5:
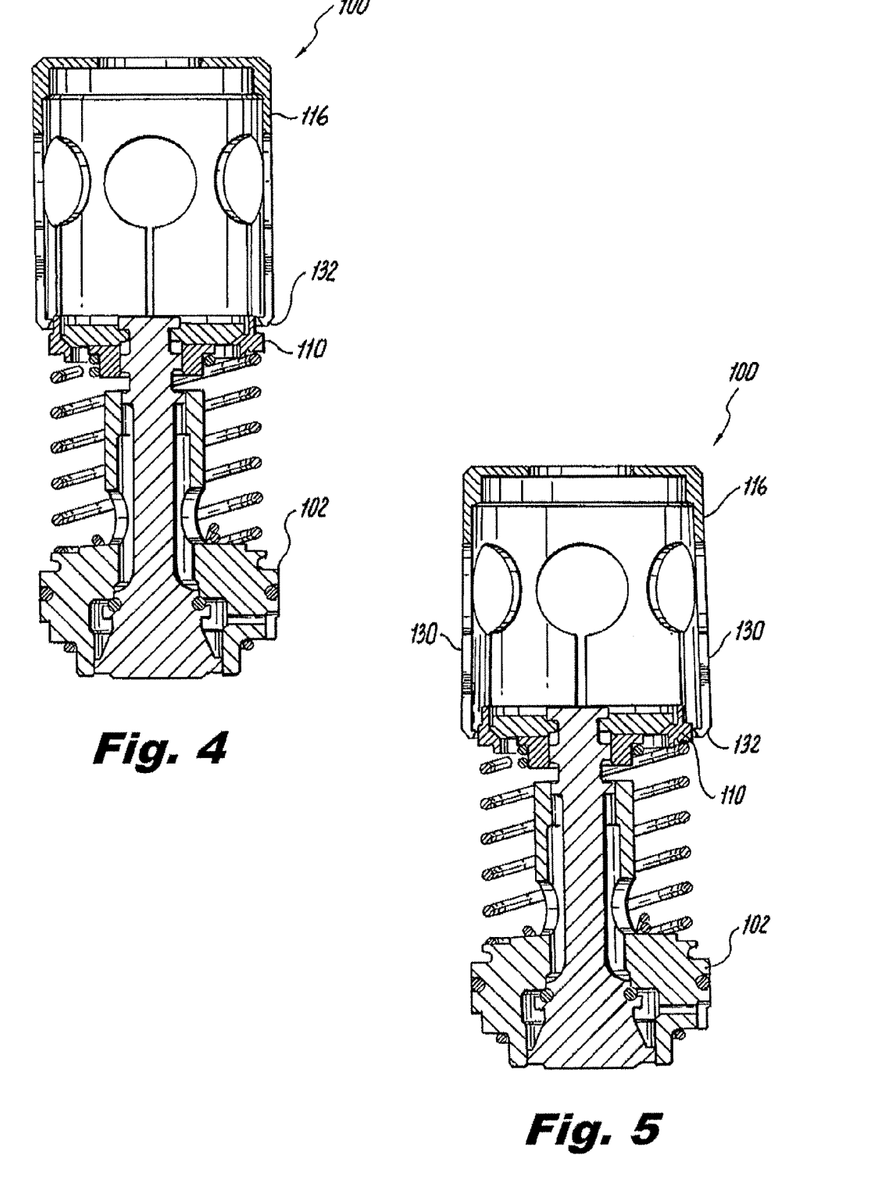
FIG. 4 is a cross-sectional side elevation view of the valve assembly of FIG. 1 during assembly thereof, showing the main spring guide proximate the main opening of the hold-down sleeve.
FIG. 5 is a cross-sectional side elevation view of the valve assembly of FIG. 1 during assembly, showing the main opening of the hold-down sleeve expanded around the main spring guide.
Figure 6:
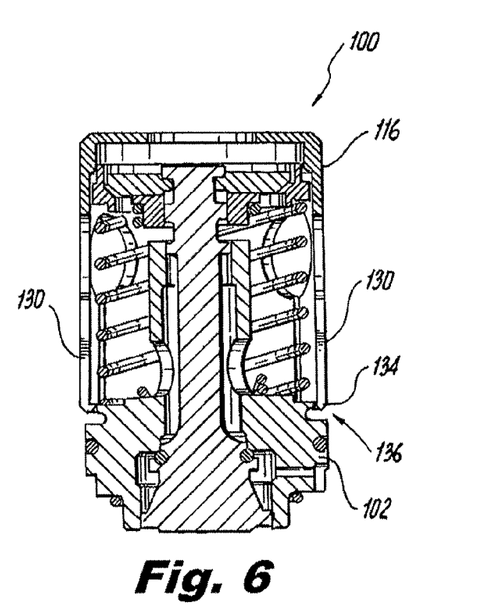
FIG. 6 is a cross-sectional side elevation view of the valve assembly of FIG. 1 during assembly, showing the main opening of the hold-down sleeve expanded around a downstream portion of the valve body.

Referring now to FIGS. 4-12, procedures or processes are shown for efficiently assembling injector 10 and valve assembly 100. In particular, FIG. 4 illustrates hold-down sleeve 116 with its main opening 132 advanced over main spring guide 110. As shown in FIG. 5, the flexibility of fingers 130 of hold-down sleeve 116 allows main opening 132 to expand radially as needed to advance over the wide portion of main spring guide 110. This flexibility also allows main opening 132 to expand as needed to advance over a wide portion of valve body 102 just prior to cleat 134 engaging circumferential groove 136 defined in the downstream end portion of valve body 102, as shown in FIG. 6.

Figure 7:
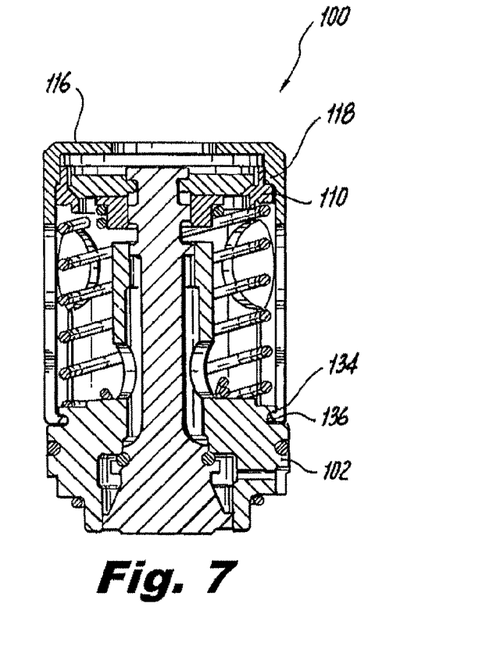
FIG. 7 is a cross-sectional side elevation view of the valve assembly of FIG. 1 during assembly, showing the cleat of the main opening in the hold-down sleeve engaged with the circumferential groove in the downstream portion of the valve body.

Referring to FIG. 7, when assembly of hold-down sleeve 116 onto valve body 102 is complete, cleat 134 is fully engaged in groove 136 of the downstream end portion of valve body 102 for locking retention of the valve components. Cleat 134 and groove 136 prevent movement of hold-down sleeve 116 with respect to the stationary portion of valve body 102. This immobility of hold-down sleeve 116 ensures stop structure 118 will properly engage main spring guide 110 as described above.

Figure 8:
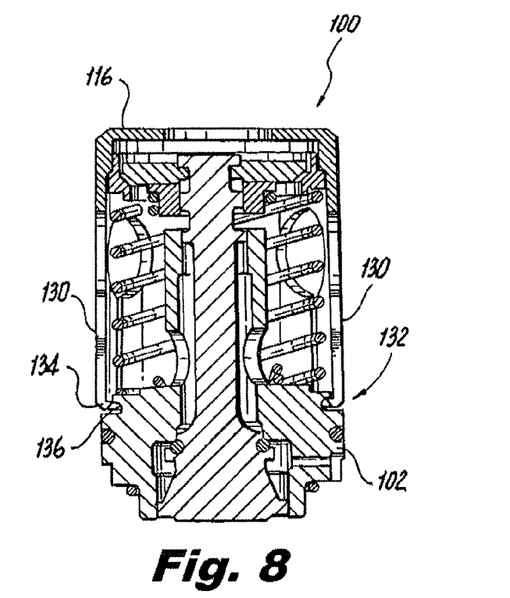
FIG. 8 is a cross-sectional side elevation view of the valve assembly of FIG. 1 during assembly, showing the cleat of the hold-down sleeve unable to fully engage the circumferential groove due to plastic deformation of the hold-down sleeve.

With reference to FIG. 8, in some injector and valve applications, the dimensions and materials used for the various components of the valve assembly may cause fingers 130 of hold-down sleeve 116 to undergo plastic deformation. Plastic deformation of fingers 130 can occur, for example, during the radial expansion of main opening 132 while passing over valve body 102, main spring guide 110, and/or other components. Such plastic deformation can leave main opening 132 partially expanded, preventing cleat 134 from fully engaging groove 136 as shown in FIG. 8. FIGS. 9-12 show how this incomplete engagement can be overcome.

Figure 9:
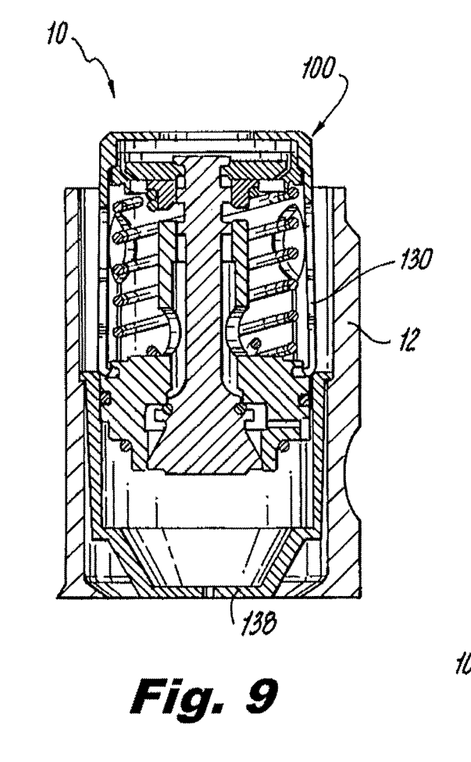
FIG. 9 is a cross-sectional side elevation view of the valve assembly of FIG. 8 during assembly into a housing, showing the downstream end portion of the valve body entering the valve housing.
Figure 10:
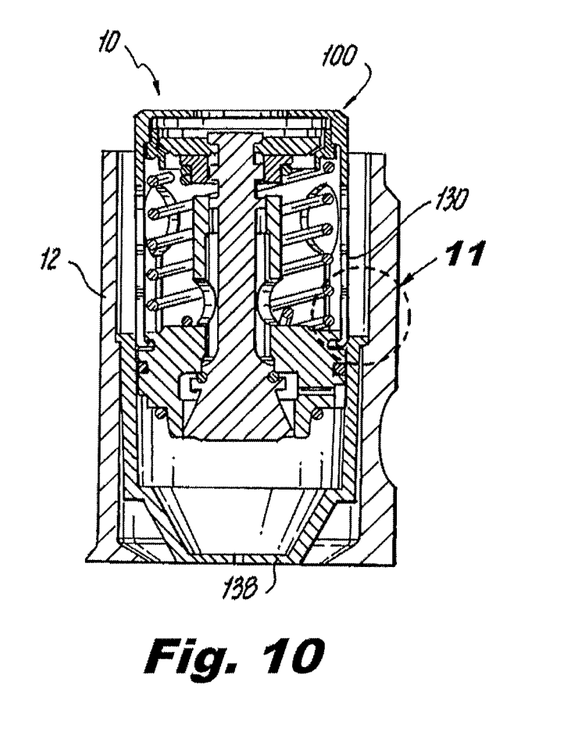
FIG. 10 is a cross-sectional side elevation view of the valve assembly of FIG. 1 during assembly into a housing, showing the housing engaging outboard of the main opening of the hold-down sleeve.
Figure 11:
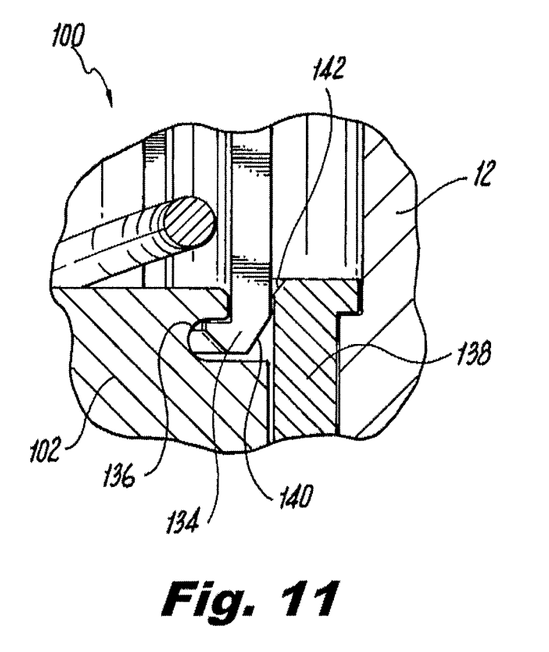
FIG. 11 is a cross-sectional side elevation view of a portion of the valve assembly of FIG. 10, showing the engagement of the hold-down sleeve and the housing, locking the cleats of the hold-down housing in the circumferential groove of the valve body.

As illustrated in FIG. 9, injector 10 includes a valve housing 138 within inlet section 12. An initial stage of seating of valve assembly 100 into valve housing 138 is shown in FIG. 9. Distended fingers 130 can be forced into a position to fully engage cleat 134 within groove 136 as valve assembly 100 is advanced into valve housing 138, as shown in FIG. 10. FIG. 11 shows an enlarged view of valve housing 138 and cleat 134. The radially outer portion of cleat 134 includes a chamfer 140 and the radially inner edge of valve housing 138 includes a corresponding chamfer 142. As valve assembly 100 is advanced into valve housing 138, chamfers 140 and 142 slide along one another pushing cleat 134 into full engagement with groove 136.

While both hold-down sleeve 116 and valve housing 138 include chamfers, those skilled in the art will readily appreciate that any other suitable chamfer configuration can be used to facilitate engagement of a valve housing outboard of a hold-down sleeve without departing from the spirit and scope of the invention. Furthermore, while cleat 134 is shown and described as being part of hold down sleeve 116, and groove 136 is shown and described as being defined in valve body 102, those skilled in the art will readily appreciate that a cleat can be defined in the valve body with a corresponding grove or other suitable recess defined in a hold down sleeve without departing from the spirit and scope of the invention. Those skilled in the art will readily appreciate that in lieu of or in addition to a cleat and groove, any other suitable type of engagement between a hold down sleeve and valve body can be used without departing from the spirit and scope of the invention.

Figure 12:
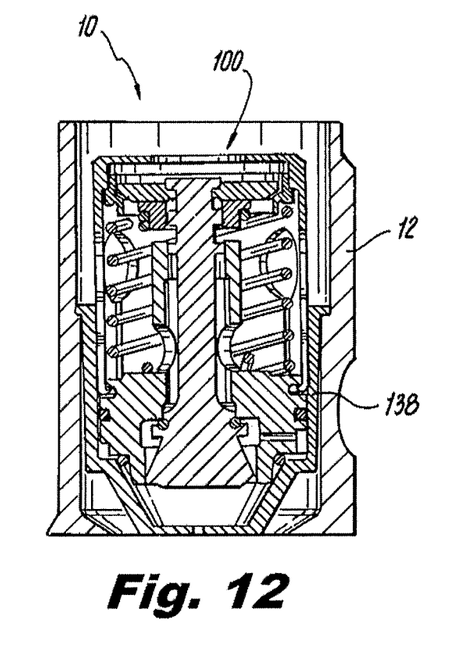
FIG. 12 is a cross-sectional side elevation view of the valve assembly of FIG. 1, showing the valve assembly seated within the valve housing.

FIG. 12 shows injector 10 with valve assembly 100 fully seated in valve housing 138. In this configuration, cleat 134 is prevented from radially outward movement, which could otherwise disengage cleat 134 from groove 136, by the engagement of valve housing 138 outboard of fingers 130. Even if fingers 130 are not distended after assembly onto valve body 102, the engagement of hold-down sleeve 116 with valve body 102 is reinforced by the limit on radial expansion against valve housing 138. This provides a redundant locking mechanism that is difficult to disrupt by outside forces, for example.

One advantage of the configurations shown in FIGS. 7 and 12 is that hold-down sleeve 116 holds gap 114 to its proper dimension in the closed condition and does not rely on weld shrink. Gap 114 is not affected by components that might be heated by the welding process.

Valve assembly 100 is independent of being altered by any welding processes within in injector 10, is not directly connected to nozzle body 20, and is shielded form any negative effects of the welding process. For example, valve assembly 100 is shielded by not being in direct contact with the outer casing of injector 10. While welding the outer cap of a conventional injector, for example, extreme heat can transfer from component to component in injectors with direct contact among components. Such directly contacting components can shrink, warp, melt, harden, or become attached to the outer casing as a result of heating during welding the outer casing together. Similar negative effects can also arise from the heat of engine operation in close proximity to the relatively cool fuel flowing through an injector. All of these negative effects from external heat can cause flow issues in conventional injectors and valves. Since valve assembly 100 is not in direct contact with the outer casing of injector 10, there is a physical fluid space between the outside casing of injector 10 and valve assembly 100, insulating valve assembly 100 from the negative effects of welding and engine heating described above. Another advantage of the configurations described above is that valve assembly 100 is self-contained, which allows for easier subassembly into injector 10 or into any other components.

While described in the exemplary context of a fuel injector, those skilled in the art will readily appreciate that the invention can be practiced in any other suitable application. For example, the retention and locking structures and methods described above can be applied to fuel strainers, snap on air swirlers, heat shields, spray cones, or any other suitable application. The devices and methods described above and shown in the drawings provide the advantages of improved valve precision and performance. The methods and systems of the present invention also provide for assembly of valves with superior results including maintaining precise geometric relationships between valve components, and the ease of installing self-contained subassemblies into larger components.

While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A pressure actuated valve assembly comprising:
    a) a valve body defining a longitudinal axis and having opposed upstream and downstream end portions, the valve body including a valve member mounted therein for axial movement along the longitudinal axis between a closed condition and an open condition, the downstream end portion of the valve body including a circumferential groove;
    b) a main spring having opposed upstream and downstream end portions, the downstream end portion of the main spring being engaged with the downstream end portion of the valve body, the main spring being axially aligned with the valve body;
    c) a main spring guide engaged with the upstream end portion of the main spring proximate the upstream end portion of the valve body, the main spring guide mounted for movement toward the downstream end portion of the valve body by compression of the main spring;
    d) a hold-down sleeve engaged with the downstream end portion of the valve body and including a stop structure proximate the main spring guide, the stop structure configured to engage the main spring guide to maintain a predetermined minimum clearance between the main spring guide and the valve member with the valve body in the closed condition, wherein the hold down sleeve includes a cleat engaged with the circumferential groove of the valve body; and
    e) a housing engaged outboard of the hold-down sleeve preventing movement of the cleat radially outward from the circumferential groove.

2. A pressure actuated valve assembly as recited in claim 1, wherein the hold-down sleeve includes a longitudinal wall that has a plurality of fluid openings configured to provide fluid communication between an area exterior to the hold-down sleeve and an area interior thereto.

3. A pressure actuated valve assembly as recited in claim 1, wherein the hold-down sleeve includes a longitudinal wall that includes a plurality of fluid openings configured to provide fluid communication between an area exterior to the hold-down sleeve and an area interior thereto, and a plurality of axial slots defined through a downstream portion of the longitudinal wall, one axial slot originating at each of the fluid openings and terminating at a downstream end of the hold-down sleeve.

4. A pressure actuated valve assembly as recited in claim 1, wherein the stop structure of the hold-down sleeve engages the main spring guide and compresses the main spring to maintain the predetermined minimum clearance between the main spring guide and the valve member of the valve body with the valve body in the closed condition.

5. A pressure actuated valve assembly comprising:
    a) a valve body defining a longitudinal axis and having opposed upstream and downstream end portions, the valve body including a valve member mounted therein for axial movement along the longitudinal axis between a closed condition and an open condition;
b) a main spring having opposed upstream and downstream end portions, the downstream end portion of the main spring being engaged with the downstream end portion of the valve body, the main spring being axially aligned with the valve body;
c) a main spring guide engaged with the upstream end portion of the main spring proximate the upstream end portion of the valve body, the main spring guide mounted for movement toward the downstream end portion of the valve body by compression of the main spring; and
d) a hold-down sleeve engaged with the downstream end portion of the valve body and including a stop structure proximate the main spring guide, the stop structure configured to engage the main spring guide to maintain a predetermined minimum clearance between the main spring guide and the valve member with the valve body in the closed condition,
wherein the hold-down sleeve includes a longitudinal wall with a plurality of axial slots defined through a downstream portion thereof with a flexible finger defined in the longitudinal wall circumferentially between each pair of adjacent axial slots.

6. A pressure actuated valve assembly comprising:
a) a valve body defining a longitudinal axis and having opposed upstream and downstream end portions, the valve body including a valve member mounted therein for axial movement along the longitudinal axis between a closed condition and an open condition;
b) a main spring having opposed upstream and downstream end portions, the downstream end portion of the main spring being engaged with the downstream end portion of the valve body, the main spring being axially aligned with the valve body;
c) a main spring guide engaged with the upstream end portion of the main spring proximate the upstream end portion of the valve body, the main spring guide mounted for movement toward the downstream end portion of the valve body by compression of the main spring; and
d) a hold-down sleeve engaged with the downstream end portion of the valve body and including a stop structure proximate the main spring guide, the stop structure configured to engage the main spring guide to maintain a predetermined minimum clearance between the main spring guide and the valve member with the valve body in the closed condition,
wherein the hold-down sleeve includes a longitudinal wall with a plurality of axial slots defined through a downstream portion thereof with a flexible finger defined in the longitudinal wall circumferentially between each pair of adjacent axial slots, and wherein each flexible finger includes a portion of an inward protruding cleat defined on a downstream portion thereof.

7. A fuel injector for a gas turbine engine comprising:
a) a fuel inlet section;
b) a feed arm extending from the fuel inlet section;
c) a nozzle body extending from the fuel feed arm and in fluid communication with the fuel inlet section;
d) an inlet housing within the fuel inlet section and defining a longitudinal axis;
e) a hold-down sleeve inboard of the inlet housing and having opposed upstream and downstream end portion with a stop structure defined in the upstream end portion, the hold-down sleeve including an inward protruding cleat defined on a downstream portion thereof;
f) a valve body having opposed upstream and downstream end portions, wherein the downstream end portion of the valve body is engaged with the downstream end portion of the hold-down sleeve, the valve body including a valve member mounted therein to regulate flow through the inlet housing by movement along the longitudinal axis between a closed condition and an open condition, the downstream portion of the valve body including a circumferential groove such that the cleat of the hold-down sleeve is engaged with the circumferential groove of the valve body, the inlet housing preventing movement of the cleat radially outward from the circumferential groove;
g) a main spring having opposed upstream and downstream end portions, the downstream end portion of the main spring being engaged with the downstream end portion of the valve body, the main spring axially aligned with the inlet housing; and
h) a main spring guide engaged with the upstream end portion of the main spring proximate the upstream end portion of the valve body, the main spring guide mounted for movement toward the downstream end portion of the valve body by compression of the main spring, and being configured and adapted to engage the stop structure of the hold-down sleeve to maintain a predetermined minimum clearance between the main spring guide and the valve member of the valve body with the valve body in the closed condition.

8. A fuel injector as recited in claim 7, wherein the hold-down sleeve includes a longitudinal wall that has a plurality of fluid openings configured to provide fluid communication between an area exterior to the hold-down sleeve and an area interior thereto.

9. A fuel injector as recited in claim 7, wherein the hold-down sleeve includes a longitudinal wall that includes a plurality of fluid openings configured to provide fluid communication between an area exterior to the hold-down sleeve and an area interior thereto, and a plurality of axial slots defined through a downstream portion of the longitudinal wall, one axial slot originating at each of the fluid openings and terminating at a downstream end of the hold-down sleeve.

10. A fuel injector as recited in claim 7, wherein the stop structure of the hold- down sleeve engages the main spring guide and compresses the main spring to maintain the predetermined minimum clearance between the main spring guide and the valve member of the valve body with the valve body in the closed condition.

11. A fuel injector for a gas turbine engine comprising:
a) a fuel inlet section;
b) a feed arm extending from the fuel inlet section;
c) a nozzle body extending from the fuel feed arm and in fluid communication with the fuel inlet section;
d) an inlet housing within the fuel inlet section and defining a longitudinal axis;
e) a hold-down sleeve inboard of the inlet housing and having opposed upstream and downstream end portion with a stop structure defined in the upstream end portion, the hold-down sleeve including an inward protruding cleat defined on a downstream portion thereof;
f) a valve body having opposed upstream and downstream end portions, wherein the downstream end portion of the valve body is engaged with the downstream end portion of the hold-down sleeve, the valve body including a valve member mounted therein to regulate flow through the inlet housing by movement along the longitudinal axis between a closed condition and an open condition, the downstream portion of the valve body including a circumferential groove such that the cleat of the hold-down sleeve is engaged with the circumferential groove of the valve body, the inlet housing preventing movement of the cleat radially outward from the circumferential groove;

g) a main spring having opposed upstream and downstream end portions, the downstream end portion of the main spring being engaged with the downstream end portion of the valve body, the main spring axially aligned with the inlet housing; and h) a main spring guide engaged with the upstream end portion of the main spring proximate the upstream end portion of the valve body, the main spring guide mounted for movement toward the downstream end portion of the valve body by compression of the main spring, and being configured and adapted to engage the stop structure of the hold-down sleeve to maintain a predetermined minimum clearance between the main spring guide and the valve member of the valve body with the valve body in the closed condition, wherein the hold-down sleeve includes a longitudinal wall with a plurality of axial slots defined through a downstream portion thereof with a flexible finger defined in the longitudinal wall circumferentially between each pair of adjacent axial slots.

12. A fuel injector for a gas turbine engine comprising:

a) a fuel inlet section;
b) a feed arm extending from the fuel inlet section;
c) a nozzle body extending from the fuel feed arm and in fluid communication with the fuel inlet section;
d) an inlet housing within the fuel inlet section and defining a longitudinal axis;
e) a hold-down sleeve inboard of the inlet housing and having opposed upstream and downstream end portion with a stop structure defined in the upstream end portion, the hold-down sleeve including an inward protruding cleat defined on a downstream portion thereof;

f) a valve body having opposed upstream and downstream end portions, wherein the downstream end portion of the valve body is engaged with the downstream end portion of the hold-down sleeve, the valve body including a valve member mounted therein to regulate flow through the inlet housing by movement along the longitudinal axis between a closed condition and an open condition, the downstream portion of the valve body including a circumferential groove such that the cleat of the hold-down sleeve is engaged with the circumferential groove of the valve body, the inlet housing preventing movement of the cleat radially outward from the circumferential groove;

g) a main spring having opposed upstream and downstream end portions, the downstream end portion of the main spring being engaged with the downstream end portion of the valve body, the main spring axially aligned with the inlet housing; and h) a main spring guide engaged with the upstream end portion of the main spring proximate the upstream end portion of the valve body, the main spring guide mounted for movement toward the downstream end portion of the valve body by compression of the main spring, and being configured and adapted to engage the stop structure of the hold-down sleeve to maintain a predetermined minimum clearance between the main spring guide and the valve member of the valve body with the valve body in the closed condition, wherein the hold-down sleeve includes a longitudinal wall with a plurality of axial slots defined through a downstream portion thereof with a flexible finger defined in the longitudinal wall circumferentially between each set of adjacent axial slots, and wherein each flexible finger is includes a portion of an inward protruding cleat defined on a downstream portion thereof.

\* \* \* \* \*